United States Patent
Vemulapalli et al.

(10) Patent No.: US 10,264,804 B2
(45) Date of Patent: Apr. 23, 2019

(54) HEAT-STABLE FILLING WITH CEREAL-DERIVED INGREDIENTS

(75) Inventors: Vani Vemulapalli, Whippany, NJ (US); Jan Karwowski, Franklin Lakes, NJ (US); Edward C. Coleman, New Fairfield, CT (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 963 days.

(21) Appl. No.: 12/907,763

(22) Filed: Oct. 19, 2010

(65) Prior Publication Data

US 2012/0093995 A1  Apr. 19, 2012

(51) Int. Cl.
*A23D 7/005* (2006.01)
*A21D 13/31* (2017.01)
*A21D 13/38* (2017.01)
*A23C 19/00* (2006.01)

(52) U.S. Cl.
CPC ........ *A23D 7/0053* (2013.01); *A21D 13/31* (2017.01); *A21D 13/38* (2017.01)

(58) Field of Classification Search
CPC ........ A23D 9/00; A23D 9/007; A23D 7/0053; A23V 2002/00; A21D 13/0019; A21D 13/0041; A21D 13/31; A21D 13/38; A23L 1/3006; A23L 1/052; A23L 1/0522
USPC ................. 426/582, 618, 622, 601
See application file for complete search history.

(56) References Cited

U.S. PATENT DOCUMENTS

| | | | |
|---|---|---|---|
| 2,930,699 A * | 3/1960 | De Sollano et al. | 426/331 |
| 3,352,688 A | 11/1967 | Messina | |
| 3,567,465 A | 3/1971 | Knechtel | |
| 3,741,777 A | 6/1973 | Wrobel et al. | |
| 3,966,993 A * | 6/1976 | Luck | 426/589 |
| 4,113,889 A | 9/1978 | Baxley | |
| 4,198,439 A | 4/1980 | Hoover | |
| 4,567,047 A * | 1/1986 | Wilson | 426/94 |
| 4,596,714 A | 6/1986 | Brabbs | |
| 4,661,360 A | 4/1987 | Smith | |
| 4,752,494 A | 6/1988 | Tang et al. | |
| 4,795,647 A | 1/1989 | Leibfred | |
| 5,268,192 A | 12/1993 | Zook et al. | |
| 5,529,801 A | 6/1996 | Morano | |
| 5,902,622 A | 5/1999 | Owusu-Ansah et al. | |
| 6,039,999 A | 3/2000 | Bakshi et al. | |
| 6,322,829 B1 * | 11/2001 | McGlynn | A23C 19/093 426/549 |
| 6,863,911 B2 | 3/2005 | Zimeri et al. | |
| 6,905,719 B2 | 6/2005 | Wang et al. | |
| 6,905,720 B2 | 6/2005 | Wang et al. | |
| 7,163,710 B2 | 1/2007 | Louter | |
| 7,452,564 B2 | 11/2008 | Jindra et al. | |

(Continued)

FOREIGN PATENT DOCUMENTS

CA    1041829 A  * 11/1978
CN    1337173 A     2/2002

(Continued)

OTHER PUBLICATIONS

Newman et al., "Lose Weight the Smart Low-Carb Way," 2002 (no month), Rodale, Inc., pp. 68-71.*

(Continued)

*Primary Examiner* — Lien T Tran
*Assistant Examiner* — Tynesha L McClain-Coleman
(74) *Attorney, Agent, or Firm* — Fitch, Even, Tabin & Flannery LLP

(57) ABSTRACT

A grain-based, soft and creamy food filling that is heat-stable is provided. By one approach, the grain-based food filling may include a continuous lipid phase and a dispersed solid including a grain-derived component.

29 Claims, 1 Drawing Sheet

(56) References Cited

U.S. PATENT DOCUMENTS

| | | | |
|---|---|---|---|
| 2002/0098267 A1* | 7/2002 | Conrad Heisey et al. | 426/94 |
| 2005/0208191 A1 | 9/2005 | Saimanohar et al. | |
| 2005/0249845 A1 | 11/2005 | Mihalos et al. | |
| 2005/0271785 A1 | 12/2005 | Hayes-Jacobson et al. | |
| 2006/0216395 A1 | 9/2006 | Franklin | |
| 2009/0081335 A1 | 3/2009 | Ortiz et al. | |
| 2010/0136182 A1* | 6/2010 | Rabault et al. | 426/94 |
| 2010/0209588 A1* | 8/2010 | Loh et al. | 426/601 |

FOREIGN PATENT DOCUMENTS

| | | | |
|---|---|---|---|
| CN | 1543871 A | 11/2004 | |
| CN | 1620928 A | 6/2005 | |
| CN | 1736250 A | 2/2006 | |
| CN | 101 317 658 A | 12/2008 | |
| FR | 2 652 993 A1 | 4/1991 | |
| GB | 436 765 A | 10/1935 | |
| JP | 2003-116492 A | 4/2003 | |
| JP | 2004-159606 A | 6/2004 | |
| UA | 55 112 A | 3/2003 | |
| WO | WO 9629894 A1 * | 10/1996 | |
| WO | 2007/017593 A2 | 2/2007 | |

OTHER PUBLICATIONS

European Patent Office PCT International Search Report and Written Opinion of the International Searching Authority for International Application No. PCT/US2011/056667 dated Dec. 1, 2011 (11 pages).

* cited by examiner

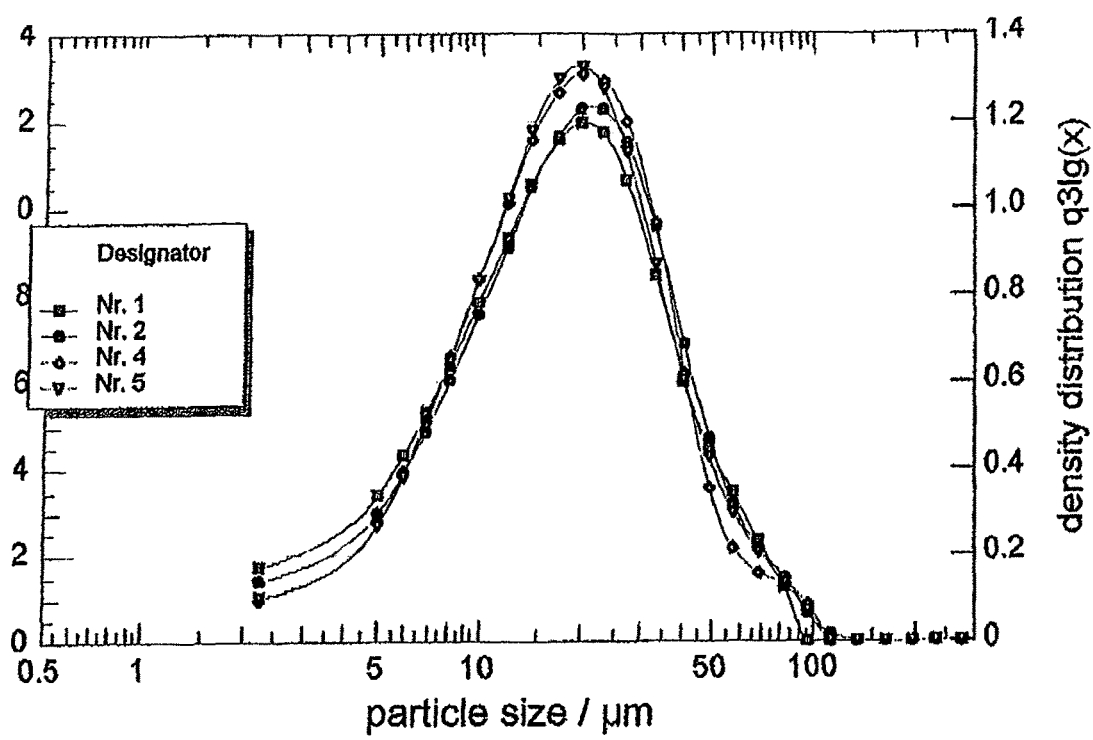

US 10,264,804 B2

HEAT-STABLE FILLING WITH CEREAL-DERIVED INGREDIENTS

FIELD

The field relates to heat-stable food fillings and, in particular, to low and intermediate water activity heat-stable sweet and savory fillings obtained using one or more cereal-derived ingredients.

BACKGROUND

Foods with textural contrast, such as baked snacks with a filling, can be appealing to a broad spectrum of consumers. These dual texture foods may include a crispy or dough component, such as a cracker, and a filling component, such as a soft and creamy, shelf-stable sweet or savory filling. Typically, the filling component may exhibit the desired creamy texture from particles dispersed in a lipid and/or aqueous continuous phase. However, such fillings tend to have the shortcoming that the dispersion structure can be thermally destabilized in some instances, such as exposure to baking temperatures, leading to spreading, boiling, and/or oiling-out upon heating. While not wishing to be limited by theory, it is believed that such thermal destabilization may be the result of aggregation of particles leading to lipid separation from other filling ingredients. Thus, such shortcoming renders manufacture of the dual texture snack challenging because the thermal exposure of the filling often needs to be carefully controlled.

In general, three approaches have been used to manufacture such dual texture snacks. By one approach, the crispy or cracker component, which is usually obtained from a dough, can be baked prior to applying the filling. By using such approach, the filling is not exposed to baking temperatures, and the shortcoming discussed above can be minimized or avoided. However, this approach can have limitations in terms of processing and limit product configurations to sandwich-type or other open ended and closed products where the filling can be easily applied after baking. Another approach is to prepare a filled dough with the filling component applied/injected therein prior to baking and then baking the dough and the filling together. A third approach is cooking/extruding a dough casing at high temperatures, pressure, and shear conditions while injecting the filling at the die to co-extrude filled snacks. As mentioned above, these last two approaches are limited by the thermal instability of the filling component at baking temperatures, such as temperatures of about 250° F. or higher, commonly used to bake crackers, chips, biscuits, and the like. When prior filling components are exposed to such baking temperatures, it can suffer from product defects such as filling spreading and oozing out, boiling-out, oiling-out, loss of smoothness, and discoloration.

Prior filling compositions have generally been formulated as aqueous or water-based systems containing an aqueous/hydrophilic liquid continuous phase as an oil-in-water emulsion combined with relatively high amounts of water activity (Aw) lowering humectants (e.g., polyols, glycerine, sugars, syrups, and the like), thickeners, and/or gelling agents (e.g., hydrocolloids, proteins, starches, and the like) to improve thermal stability. These prior fillings, however, are generally unacceptable from an organoleptic standpoint because they can be syrupy or gummy in texture and can often be undesired as a creamy, savory filling (such as a cheese-based filling) due to unwanted sweetness and/or unpleasant aftertaste resulting from the use of humectants such as glycerine.

One typical example of a cheese filling based on the prior creamy fillings is an oil-in-water emulsion composition. Such fillings have a continuous water phase in which the oil phase is dispersed. In this prior filling, the water or hydrophilic phase is mainly made of glycerol (or other polyhydric alcohols), polydextrose syrup, corn syrup, and mixtures thereof. Such construction of these emulsion fillings may be generally stable at low temperatures, but under baking conditions the fillings are typically prone to boil-out or bleed-oil as the lipid phase can potentially undergo coalescence resulting in phase separation or inversion. In addition, the water may also escape from the filling at baking temperatures resulting in blow-out of the dough or unwanted large voids. These prior liquid-liquid emulsions also tend to be interfacially dynamic and their stability can be highly sensitive to shear, processing (e.g., extrusion, etc.), handling, and storage conditions.

Attempts to prepare creamy, emulsion-based fillings that are bake-stable typically included additional components that compromise other qualities. For example, prior creamy filling include gelling agents (such as whey protein), thickeners, humectants (such as glycerine), polyols or other additional ingredients to improve stability, but such ingredients can compromise desired organoleptic qualities that may alter the desired taste, texture, and/or flavor of the filling or otherwise lessen the eating experience. In some cases, high amounts of these ingredients can impart an undesirable aftertaste (such as bitterness or a burning sensation from glycerols), which can be especially pronounced in salty or savory fillings. With high amounts of glycerine or glycerol, which can also impart additional sweetness to the filling, prior savory bake stable fillings may also require the use of flavor modifiers (e.g., lactisol syrup) to suppress undesired sweetness provided by the glycerol. Such additional use of gums, humectants, glycerine, thickeners, polyols, and flavor masking ingredients can be undesired in many cases.

In yet other instances, baked filled snack products may employ the use of peanut-based or other nut-based ingredients as a component of the food filling. While such fillings may be described as heat or bake stable, they use peanut or other nut or bean based ingredients in the filling. Peanut and nut or bean based ingredients are less desired by many consumers.

SUMMARY

A grain-based soft and creamy food filling that is heat-stable, in some cases, up to an oven temperature of at least about 500° F. and, in other cases, up to a filling temperature of at least about 300° F. is provided. By one approach, the grain-based soft and creamy food filling includes a continuous lipid phase including at least one lipid having a melting point of about 40° C. or lower and a dispersed solid phase in the continuous lipid phase. The dispersed solid phase includes a hydrophilic powder and a grain-derived component. The filling also has a ratio of the grain-derived component to the lipid phase effective to impart heat stability of the filling so that the grain-based soft and creamy food filling exhibits minimal filling spread upon a sample heated for about 10 minutes at about 300° F.

In another approach, the grain-based soft and creamy food filling includes a continuous lipid phase with a first lipid and a second lipid having a melting point greater than the first lipid. The filling also includes a grain-derived component dispersed in the continuous lipid phase, and a ratio of the grain-derived component to the lipid phase effective so that the grain-derived soft and creamy food filling is heat stable and exhibits a filling spread of about 1.2 cm or less upon a sample heated for about 10 minutes at about 300° F.

BRIEF DESCRIPTION OF THE DRAWINGS

FIG. 1 is an exemplary plot of particle size distribution of ground wheat germ.

DETAILED DESCRIPTION

Grain-based, soft and creamy food fillings are provided that remain stable at elevated temperatures and ambient storage conditions. In one aspect, the heat-stable fillings are based on one or more cereal or grain-derived components blended into the food filling in amounts effective to stabilize a lipid and/or lipid phase when exposed to elevated temperatures, such as under baking temperatures. In another aspect, the grain-based fillings have select ratios of the grain-derived components to the lipid or lipid phase effective to impart the heat stability. The grain-based fillings of this disclosure can be applied to intermediate and low water activity (Aw) fillings. The grain-based fillings may be used in cookies, crackers, biscuits, pastries, snacks, and other edible foods prior to baking and still retain a soft and creamy texture after being exposed to elevated and/or baking temperatures. It was expected that the use of grain-derived components in a food filling could result in a dry and undesirable filling because the fiber and protein in the grain-derived components normally lead to texturally dry products (i.e., breads, dough, pastas, etc.) or products that go rancid without a long shelf life. However, it was discovered that use of up to about 25 weight percent of the grain-derived ingredients in combination with the methods and ratios described herein, could be used in fillings that remain soft and creamy with a shelf life of up to about six months or more.

By one approach, the grain-based fillings described herein are a low water activity filling that may include the grain-derived component together with one or more lipids and a hydrophilic powder in specific relationships with the grain-derived component effective to form a heat stable filling that remains texturally soft and creamy at elevated temperatures, such as oven temperatures of at least about 250° F. and, preferably, about 250° F. to about 500° F. Such fillings also remain stable at an internal or a filling temperature up to about 300° F. and in some cases about 150° F. to about 300° F. In this approach, the grain-based fillings herein are generally low water activity, solid-in-lipid dispersions with substantially no aqueous phase where the hydrophilic powder and grain-based component primarily form a discontinuous solid phase in a continuous lipid phase of the filling.

By another approach, the grain-based fillings are an intermediate water activity filling that includes a blend of real or processed cheese, hydrophilic powders, and a grain-derived component that also remain texturally soft and creamy at the baking conditions mentioned above. The real or processed cheese may provide dairy proteins, moisture, and fats. The intermediate water activity fillings also remain stable at baking temperatures of at least about 250° F. and, preferably, about 250° F. to about 500° F. as well as at a filling temperature up to about 150° F. to about 300° F.

These compositions have unique thermal and mechanical properties that make them ideal as a low or intermediate water activity, soft and creamy food filling suitable in low and intermediate moisture foods that benefit from the filling being applied prior to baking. The grain-derived component is advantageous in such systems because it is effective to provide enhanced binding or absorbing properties to help stabilize the lipids and liquids in the system so as to stabilize the filling matrix. The grain-derived component also stabilizes by absorbing moisture from steam generated during the heating process. To this end, the grain-derived component may be included in the filling in certain ratios relative to the lipid phase and/or have certain particle size distributions to achieve this unique absorbing, binding, or retaining capacity. Thus, even under practical commercial baking conditions, the fillings herein exhibit minimal to no filling spread, boil-out, oil-out, or oil bleeding. In general, insufficient levels of the grain-derived component form a filling that tends to be too oily. Excessive levels of the grain-derived component, on the other hand, tend to form a filling that is too dry and not smooth or lubricious. Moreover, the fillings herein minimize, and in some cases, prevent oil migration from the filling to a dough casing or other dough component adjacent the filling.

In yet another aspect, the fillings herein may have little or no aqueous phase, and include substantially no polyol-based humectants (such as glycerol, sorbitol, polydextrose and the like), gelling agents, (such as gelling proteins, hydrocolloids, and the like) or thickeners (such as starches, gums, and the like) that tend to alter the taste and mouthfeel of the prior creamy fillings. As used herein, substantially no poly-based humectants generally means about 7.5 percent or less, preferably about 5 percent or less, and more preferably, about 1 percent or less, and most preferably, about 0 percent humectants. Substantially no gelling agents and thickeners generally means the fillings have less than about 1 percent of such additional ingredients, preferably less than about 0.5 percent of such ingredients, and most preferably about 0 percent gelling agents and/or thickeners. Such amounts are generally ineffective to provide any functional benefit. Unless specifically defined herein, substantially no ingredient in the composition generally means an amount that provides no functional benefit and, in most instances, will be about 1 percent or less, in other instances, about 0.5 percent or less, in yet other instances, about 0.1 percent or less, and most preferably, about 0 percent.

Unlike the prior emulsion-based fillings, the grain-based, heat-stable food fillings herein generally complement the organoleptic properties of more traditional cheese-based snack products (such as natural cheddar cheese) in flavor, taste, and creamy mouthfeel even after being exposed to practical commercial baking conditions. The edible food fillings herein are rapid and clean melting, free from residue, and have a creamy (i.e., smooth, non-sticky, non-syrupy, and non-waxy) appearance and mouthfeel. Additionally, the edible food filling compositions described herein possess a stable structure which resists the tendency to bloom or crumble over its shelf life and provide good stability against thermal abuse. In particular, the edible food filings herein remain stable at elevated temperatures without boiling-out, oil-bleeding, or loss of softness and creaminess. Through out its shelf life, the filling herein also minimize, and preferably, prevent oil migration from the filling to the adjacent dough or casing.

In yet another approach, methods of forming a food product having a soft and creamy filling are also provided. In one aspect, the method includes applying the grain-based, heat-stable food fillings to, on, into, or in between a dough or dough base prior to baking or heating using a suitable applicator, die, injector, and/or other known device. After application of the filling, the dough and filling combination are both exposed to elevated temperatures, such as temperatures of up to at least about 250° F. and, preferably, about 250° F. to about 500° F. By another approach, the filling and dough may be cooked and extruded at high temperatures (up to at least about 250° F. and, preferably, about 250° F. to about 500° F.), high pressures, and shear conditions while the filling is extruded or injected at a die interface to form co-extruded filled snacks, such as an envelope or casing around the filling. After baking, the filling exhibits the stability characteristics as described herein.

Turning to more of the specifics, one approach of the fillings herein include a low water activity, heat-stable, grain-derived, soft and creamy filling that, in one approach, is derived from cereal germ-based filling components. The filling may be added to dough products prior to baking and remain creamy and smooth after baking. The filing of this approach may include about 5 to about 25 weight percent of the grain-derived component, about 0 to about 15 percent of a first lipid (such as an oil), about 20 to about 40 percent of a second lipid having a melting point greater than the first lipid (such as a fat), and about 25 to about 40 percent of a hydrophilic powder. The water activity may be about 0.5 or less and, preferably, about 0.2 to about 0.4. In this approach, the first and second lipids generally form a continuous lipid phase in which the grain-derived component and hydrophilic powder form a discontinuous phase dispersed therein.

Suitable grain-derived components may include any component that generally employs the entire cereal germ. Suitable examples include, but are not limited to, ground wheat germ or ground grain derivatives such as cereal germs, corn flour, pregelatinized corn flour, corn masa flour, whole oat flour, and the like. In one case, when the grain-derived components is provided by wheat germ, it provides all attributes of the grain including about 10 to about 18 percent fiber and about 20 to about 30 percent protein.

While not wishing to be limited by theory, it is believed that the germ-derived component aids in the heat stability of the fillings herein because the selected particle-size and/or the amount of the grain-derived component relative to the lipid components may enable the grain-derived element to bind, retain, and/or absorb oil, fats, and moisture in the filling. Again, while not wishing to be limited by theory, when the grain-derived component is provided by ground wheat germ it may include fiber (such as about 10 to about 15 percent), protein (such as about 20 to about 30 percent), and carbohydrates in amounts effective to help bind, retain, or absorb moisture and oil. The unique formulations herein limit and, in some approaches, inhibit the amount of fat and/or oil migration from the filling to the dough casing or dough adjacent the filling due to the effective amounts and form of the grain-derived components in the filling. This beneficial property of minimal to limited oil migration is achieved even over an extended shelf life, preferably, without the use of moisture or oil barriers between the filling and casing.

By one approach, the grain-derived component may be ground to a small particle size to provide an effective surface area coverage to adequately bind, retain, and/or absorb the oil, fat, and/or moisture in the filling. By one approach, about 100 percent of the grain-derived component will pass through a US 20 mesh screen with the following mesh size distribution: about 15 to about 20 percent retained on a US 40 screen, about 35 to about 40 percent retained on a US 60 screen, about 12 to about 18 percent retained on a US 80 screen, about 5 to about 10 percent retained on a US 100 screen, and about 20 to about 15 percent will pass through the US 100 screen to be collected in the bottom pan. By another approach, the grain-derived component has a mean particle size of about 30 to about 40 microns, a median particle size of about 10 to about 15 microns, and a mode of about 12 to about 17 microns (Beckman Coulter Particle Size Analyzer). In yet another approach, the grain-derived component may be finely ground wheat germ with a D50 particle size of about 15 to about 20 microns and a D90 particle size of about 40 to about 45 microns (Sympatec HELOS). D50 and D90 commonly refer to the particle size that 50 volume percent and 90 volume percent, respectively, of the particles are smaller than. In this approach, the finely ground wheat germ may also have an average particle size distribution of about 15 to about 25 microns. FIG. 1 provides an exemplary particle size distribution of one type of ground wheat germ suitable for the fillings herein measured using a Sympatec HELOS particle size analyzer.

By another approach, select ratios of the grain derived component to the lipid or lipid phase may be needed to impart heat stability. For example, in some cases, effective ratios of the grain-derived component to a lower melting point lipid component (i.e., a grain-to-oil ratio) in the filling effects heat stability. In this approach, the grain-to-oil ratio may range from about 0.8 to about 3.0, and in other approaches, about 1 to about 2.6. Insufficient levels of the grain-derived component relative to the lower melting point lipid component forms a filling that tends to be too oily. On the other hand, excessive levels of the grain-derived component relative to the lower melting point lipid component tend to form a filling that is too dry and not smooth or lubricious. The fillings may also have a lipid phase with a ratio of a higher melting point lipid to a lower melting point lipid (i.e., a lipid ratio) ranging from about 1 to about 4, and in other cases, about 1.6 to about 3.3. It was also discovered, in some cases, that a unique relationship between the two ratios results in a soft and creamy filling that effectively retains fats, oils, and moisture when using the grain-derived component(s) described herein. For example, in some cases, the fillings may have a relatively narrow range of the grain-derived component relative to the total lipid component (i.e., the low melting point lipid and the higher melting point lipid) between about 0.2 and about 0.65 as evidenced by a grain-to-total lipid ratio of formula A below:

$$\frac{\text{Grain-derived Component}}{\text{Total Lipid}} \quad (A)$$

Suitable lipids for the lipid phase include natural or partially hydrogenated vegetable or animal lipids including, for example, coconut oil, palm kernel oil, soybean oil, palm oil, sunflower oil, corn oil, canola oil, high oleic canola oil, cottonseed oil, peanut oil, cocoa butter, anhydrous milkfat, lard, beef fat, and the like, as well as mixtures thereof including oil soluble components derived therefrom, such phospholipids. By one approach, the suitable lipids are generally low-melting point fats and oils, such as hydrogenated or non-hydrogenated oils having a melting point of about 40° C. or lower. Suitable edible, low-melting point oils include vegetable oils, coconut oil, palm oil, palm kernel oil, anhydrous milkfat, corn oil, soybean oil, canola oil, and mixtures thereof. By one approach the lipid phase may include a blend of first and second lipids, such as a lower melting point lipid and a higher melting point lipid, such as a blend of high oleic canola oil (and the like) and palm fat (and the like), respectively. As explained above, the filling may include about 0 to about 15 percent (in other cases, about 3 to about 15 percent) of the first or lower melting point lipid and about 20 to about 40 percent of the second or higher melting point lipid.

In some cases, a high-melting point lipid may also be used. For example, high-melting lipids can have a melting point of at least about 70° C. or, in some cases, melting points of about 100° C. or higher. If used, suitable high-melting lipids include edible long chain fatty acids, their monoglycerides, diglycerides, and triglycerides, their alkaline metal salts, and other derivatives thereof. Generally, the edible, high-melting lipids are formed from long chain fatty acids having at least 16 carbon atoms and preferably 18 to 26 carbon atoms; preferably, the long chain fatty acids are saturated. Suitable saturated long chain fatty acids used to form the edible, high-melting fats include, for example, palmitic acid, stearic acid, arachidic acid, behenic acid, and the like; their derivatives, including, for example, glycerol monostearate, glycerol distearate, glycerol tristearate, calcium stearate, magnesium stearate, high-melting sucrose polyesters, high-melting fatty alcohols, high-melting waxes, and the like, as well as mixtures thereof. In addition, synthesized or chemically derived oils or oil substitutes may also be applicable, such as sucrose polyester of fatty acids.

The hydrophilic powder suitable for use in the present food filling is preferably selected from dry flavor powders having primarily crystalline materials, but may include a mixture of crystalline and amorphous components with a moisture content of about 8 percent or less and, in some cases, about 5 percent or less. Suitable hydrophilic powders may also include dry flavoring powders having a glass transition temperature of about 25° C. or less at about 50 percent relative humidity. Hydrophilic powders include any edible powder that is readily or substantially water-soluble or water-plasticizable rendering the hydrophilic particles in the powder to soften, swell, and/or become sticky. By one approach, suitable hydrophilic powders include edible food powders containing at least one percent of water-soluble or water-plasticizable substances. Edible water-soluble or water-plasticiable substances include, but are not limited to, carbohydrate, protein, mineral salts (both organic and inorganic) and their complexes or combinations thereof. Edible water-soluble or water-plasticizable substances may further include edible dry powders derived from fruits, vegetables, herbs, spices, cereals, nuts, seed, legumes, milks, meats, eggs, seafood, and the like. Examples of suitable hydrophilic powders include powders with cheese, fruit, vegetable, spice, sugar, salt, acidulants (lactic acid, citric acid, malic acid, and the like), flavorants (cream powder, fruit powder, spices, and the like), tastants (hydrolyzed protein, MSG, and the like), and like ingredients. By one approach, a suitable hydrophilic powder is a cheese powder, such as CHEEZ-TANG (Kraft Foods Ingredients, Memphis, Tenn.).

The fillings may also include optional additional ingredients or food additives that may be blended therein. Examples of additional additives include soluble and insoluble fibers, fat-soluble color compounds, such as annatto and paprika extract and the like. The filling may also include moisture bearing substances (such as cereal flour and the like) and thermally unstable substances (such as amorphous corn solids and the like), emulsifiers such as mono and diglycerides, lecithin, which may be included in amounts less than about 10 percent by weight of the filling product. In a further embodiment, such moisture bearing and thermally unstable substances are substantially absent from the fillings. The fillings may also include low amounts of hydrocolloids, gums (i.e., less than 3 percent), preservatives (i.e., less than about 1 percent), and yeast extract. Unless specified above and if used, each of these optional ingredients will only be provided in amounts of about 3 percent or less, more preferably, about 1 percent or less, and in some cases, about 0.5 percent or less. Optionally, low-water activity, edible inlays (such as roasted nuts, chocolate, candy, dry fruits, dry vegetables, herbs, and the like) may be added to the filling product either before or after blending the other ingredients.

Not to be limited by theory, it is believed that undesirable spreading or boiling-out of the prior food filling may often be related to the destabilization of the dispersion structure, and filling spread or oiling-out occurs when the destabilized filling composition becomes fluid or free running during baking. In the present compositions, on the other hand, while not wishing to be limited by theory, it is believed that the grain-derived component or at least certain portions thereof (such as the lipid, fiber, protein, and carbohydrate network, particle size, and combinations thereof) may stabilize the filling structure because the grain-derived component functions as a capillary network that can immobilize liquids (i.e., fats, oils, and moisture) so that the lipids and other liquids are bound or otherwise retained in the filling even under baking conditions and over extended shelf life. Since the low water activity lipid based fillings of the present disclosure contain practically no water or aqueous phase, blow-out of the dough sheet or excessive void formation seen in the prior art emulsion-based fillings with an aqueous phase is practically not a problem with the fillings herein. For instance, the compositions herein preferably contain about 5 percent or less moisture. Preferably, there is no added water in the fillings.

As used herein, heat stability is defined by using a spread test. Using the spread test, the heat stability can be evaluated by measuring the amount of filling spread upon heating. The compositions described herein are considered heat stable because they have minimal filling spread and minimal oil-bleeding at commercial baking conditions, such as about 250° F. or higher and, preferably, about 250° F. to about 500° F. baking temperatures. For example, when about 25 grams of the filling compositions are placed in a semi-spherical shape on a filter paper base (such as Whatman #4 paper) and exposed to about 300° F. for about 10 minutes, they exhibit minimal filling spread beyond the original deposit of filling. For purposes herein, minimal filling spread should be less than about 1.2 cm, preferably less than about 0.7 cm, and more preferably less than about 0.1 cm spread beyond the original deposit of filling. This spread test is more fully described in the Examples provided below.

As mentioned above, even with the use of a relative high amount of grain-derived components, the fillings in a finished product remain stable at ambient temperatures (generally about 70 to about 80° F.) for about 6 months or more. As shown more in the Examples, stability or shelf stability in accelerated shelf life studies of a finished co-extruded product is evidenced by about 10 ppm or less of hexanal compounds.

In yet another approach, the low water activity fillings herein may also include amount of emulsifiers beyond that normally used in prior fillings. For example, the fillings may include lecithin in amounts up to about 8 percent and, in some cases, about 0.5 to about 8 percent. In some cases, the total emulsifier could be up to about 10 percent. For example, the fillings could include a blend of about 6 to 7 percent lecithin and about 3 to 4 percent mono and/or diglycerides.

In other cases, the fillings herein may use relatively low sweetness sugars and sweeteners. By one approach, the low sweetness sugars and sweeteners include sugars and sweeteners with a sweetness generally less than sucrose. By one approach, the fillings herein may include maltose, lactose, and the like as well as mixtures thereof.

By another approach, the filings herein may also include an intermediate water activity filling that is a heat-stable, grain-derived fillings. In this alternative approach, the filling may include about 10 to about 30 percent of a grain-derived component, about 40 to about 45 percent of a real or processed cheese, and about 30 to about 45 percent of a hydrophilic powder. The cheese component provides fats, moisture, and proteins.

Advantages and embodiments of the fillings described herein are further illustrated by the following Examples. However, the particular conditions, processing schemes, materials, and amounts thereof recited in these Examples, as well as other conditions and details, should not be construed to unduly limit this method. All percentages are by weight unless otherwise indicated.

EXAMPLES

Example 1

This example relates to a low-water activity cheese filling using wheat germ as the grain-derived ingredient. Water activity of the filling prior to any baking was 0.28. The formula for this Example is provided below in Table 1 (rounded to nearest tenth). The filling was prepared by mixing in an upright mixer at ambient temperature at low shear by first blending the dry ingredients at low speed. Then, the liquid and pasty ingredients were mixed with the dry ingredients at low speed. After all ingredients were blended, the mixer was set to a medium or high speed to uniformly blend the filling. This exemplary filling had a grain-to-total lipid ratio of 0.6 (i.e., wheat germ/(High Oleic Canola Oil+Palm Fat)), a lipid ratio of 3.3 (i.e., palm fat/High Oleic Canola Oil), and a grain-to-oil ratio of 2.6 (i.e., wheat germ/High Oleic Canola Oil).

TABLE 1

Low Water Activity Cheese Filling

| Ingredients | Amt, % |
| --- | --- |
| Cheez Tang (Kraft Foods Ingredients) | 31.8 |
| Cream powder | 7.5 |
| Citric acid | 0.4 |
| Salt | 0.4 |
| Maltose | 2.5 |
| Raw ground wheat germ | 16 |
| Palm fat | 20 |
| Glycerine | 5.0 |
| High oleic canola oil | 6.0 |
| Lecithin | 7.5 |
| Autolyzed yeast extract | 1.0 |
| Flavor | 2.0 |

The acceptability of this filling was tested using the spread test. A Whatman #4 filter paper (9 inch diameter) was set into a glass baking pan (9×12×12 inches). A Teflon ring was placed on the center of the filter paper. The ring had about a 4.3 cm inner diameter at the bottom, about a 3.8 cm diameter at the top, and a wall height of about 0.75 inches. A thin wipe of vegetable oil was applied about the inner surface of the ring. Using a spatula, the ring was filled with the filling of Table 1 (about 25 grams). Excess filling was scraped from the top of the ring so that the top surface of the filling is approximately flat with the top of the ring. Then, the ring is carefully slid off the filling deposit. The filter paper and filling deposit in the baking pan is then placed in an oven set to about 300° F. for about 10 minutes. After about 10 minutes, the baking pan is removed from the oven and cooled at room temperature. Using a caliper, the diameter or spread of the filling deposit is measured. Total filling spread or total spread diameter of about 4.3 cm (i.e., 0 cm spread) to about 5.5 cm (i.e., 1.2 cm spread) cm is acceptable or heat stable. In other words, acceptable filling spread after baking may be about 1.2 cm or less. In this Example, the filling of Table 1 above exhibited a total filling spread diameter after baking of about 4.5 cm. or about 0.2 cm filling spread.

Example 2

This is another example of a low water activity cheese filling using wheat germ as the grain-derived component. Water activity before baking was 0.29. The formula of the cheese filling for this Example is provided below in Table 2 (rounded to nearest tenth) and was prepared using the mixing procedure of Example 1. This exemplary filling had a grain-to-total lipid ratio of 0.25, a lipid ratio of 2.35, and a grain-to-oil ratio of 0.85.

TABLE 2

Low Water Activity Cheese Filling

| Ingredients | Amt, % |
| --- | --- |
| Cheez Tang (Kraft Foods Ingredients) | 31.8 |
| Cream powder | 7.5 |
| Citric acid | 0.4 |
| Salt | 0.4 |
| Maltose | 2.5 |
| Raw ground wheat germ | 8.5 |
| Palm fat | 23.5 |
| Glycerine | 5.0 |
| High oleic canola oil | 10.0 |
| Lecithin | 7.5 |
| Autolyzed yeast extract | 1.0 |
| Flavor | 2.0 |

The spread test of Example 1 was performed on the filling of Table 2 and resulted in a total spread diameter after baking of about 5.1 cm or 0.8 cm filling spread.

Example 3

This is an example of a low water activity cheese filling. In this example, the grain derived ingredient was also wheat germ. The water activity was 0.32. The formula for this filling is provided below in Table 3 (rounded to nearest tenths) and mixed using the procedures of Example 1. This exemplary filling had a grain-to-total lipid ratio of 0.4, a lipid ratio of 4, and a grain-to-oil ratio of 2.

TABLE 3

Low Water Activity Cheese Filling

| Ingredients | Amt, % |
| --- | --- |
| Cheez Tang (Kraft Foods Ingredients) | 30.0 |
| Spray dried vegetable shortening | 10.0 |
| Citric acid | 0.3 |
| Salt | 0.2 |
| Maltose | 4.5 |
| Raw ground wheat germ | 10.0 |
| Palm fat | 20.0 |

TABLE 3-continued

Low Water Activity Cheese Filling

| Ingredients | Amt, % |
| --- | --- |
| Mono and diglycerides (melted in oil) | 3.5 |
| Glycerine | 7.5 |
| High oleic canola oil | 5.0 |
| Lecithin | 6.5 |
| Color | 0.1 |
| Autolyzed yeast extract | 0.5 |
| Flavor | 1.0 |

The spread test of Example 1 was performed and the filling of Table above resulted in a total spread diameter after baking of about 4.4 cm or about 0.1 cm filling spread.

Example 4

This is an Example of an intermediate water activity cheese filling. In this Example, the grain derived component was also wheat germ. The water activity was 0.83. The formula for this filling is provided below in Table 4 (rounded to nearest tenths) and mixed using the procedures of Example 1.

TABLE 4

Intermediate Water Activity Cheese Filling

| Ingredients | Amt, % |
| --- | --- |
| Cheese (Cheez Kake Blend, Kraft Foods Ingredients) | 45.0 |
| Cheez Tang cheese powder (Kraft Foods Ingredients) | 33.8 |
| Raw ground wheat germ | 10.0 |
| Glycerine | 7.5 |
| Fiber | 1.0 |
| Lecithin | 0.5 |
| Sodium alginate | 0.5 |
| Food color | 0.1 |
| Salt | 0.2 |
| Lactic acid | 0.2 |
| Autolyzed yeast extract | 0.2 |
| Potassium sorbate | 0.7 |
| Flavor | 0.5 |

The spread test of Example 1 was performed and the filling of Table 4 resulted in minimal filling spread after baking that was observed to be about 5.5 cm or less.

Example 5

Shelf life was also studied on the grain-based fillings. Acceptable shelf life in accelerated storage conditions (i.e., at about 126° F.) is a filling with about 10 ppm or less of hexanal compounds. The fillings of Tables 5 and 6 below used either raw or stabilized (i.e., toasted) ground wheat germ for the grain-derived component. These fillings were prepared using the mixing procedure of Example 1. The fillings of Tables 5 and 6 had a grain-to-total lipid ratio of 0.51 and 0.52, respectively.

TABLE 5

Filling using Raw Ground Wheat Germ

| Ingredients | Amt, % |
| --- | --- |
| Cheez Tang (Kraft Foods Ingredients) | 27.5 |
| Raw ground wheat germ | 20.0 |
| Palm fat | 39.0 |
| Cream powder | 2.5 |

TABLE 5-continued

Filling using Raw Ground Wheat Germ

| Ingredients | Amt, % |
| --- | --- |
| Modified starch | 1.0 |
| Salt | 0.5 |
| Lactic acid | 0.5 |
| Sodium alginate | 0.5 |
| Lecithin | 0.5 |
| Glycerine | 5.0 |
| Corn syrup, 42 DE | 2.0 |
| Flavor | 1.0 |

TABLE 6

Filling using Stabilized Ground Wheat Germ

| Ingredients | Amt, % |
| --- | --- |
| Cheez Tang (Kraft Foods Ingredients) | 27.5 |
| Stabilized ground wheat germ | 20.0 |
| Palm fat | 38.0 |
| Cream powder | 2.5 |
| Modified starch | 1.0 |
| Salt | 0.5 |
| Lactic acid | 0.5 |
| Sodium alginate | 0.5 |
| Lecithin | 0.5 |
| Glycerine | 5.0 |
| Maltose | 2.0 |
| Flavor | 2.0 |

The spread test of Example 1 was performed and the filling of Tables 5 and 6 resulted in minimal filling spread after baking that was observed to be about 5.5 cm or less.

Each filling was then co-extruded into a snack product, baked, and evaluated for shelf stability by measuring moisture, relative humidity, and hexanal content for 8 weeks of accelerated storage at about 126° F. Results of the shelf life study are provided in Table 7 below for both fillings. Both samples had a hexanal content less than about 10 ppm and were acceptable after 8 weeks of accelerated storage at about 126° F.

TABLE 7

Shelf Life

| Product | Weeks | Moisture, % | RH, % | Hexanals, ppm |
| --- | --- | --- | --- | --- |
| Raw wheat germ based cheese filling | 0 | 4.42 | 30.2 | 0.24 |
|  | 2 | 4.41 | 35.2 | 3.12 |
|  | 6 | 4.45 | 32.8 | 0.82 |
|  | 8 | 4.75 | 35.6 | 2.28 |
| Stabilized wheat germ based cheese filling | 0 | 3.20 | 14.6 | 1.16 |
|  | 2 | 2.70 | 21.4 | 1.92 |
|  | 6 | 2.67 | 15.3 | 1.84 |
|  | 8 | 3.16 | 18.9 | 1.52 |

Example 6

Shelf life was also studied on the grain-based fillings of Table 8 below. Three separate fillings were made using the following for the grain-derived ingredient: (1) raw ground wheat germ, (2) pregelatinized corn flour, and (3) pregelatinized whole oat flour. Results of the shelf life study are found below in Table 9. The fillings were mixed using the procedures of Example 1. These exemplary fillings had a grain-to-total lipid ratio of 0.62, a lipid ratio of 1.6, and a grain-to-oil ratio of 1.6.

TABLE 8

Formulation

| Ingredients | Amt, % |
|---|---|
| Cheez Tang powder (Kraft Foods Ingredients) | 28.0 |
| Cream powder | 2.0 |
| Salt | 0.5 |
| Lactic acid, 88% | 0.4 |
| Grain derived ingredient (either raw ground raw wheat germ, pregelatinized corn flour, or pregelatinized whole oat flour) | 20.0 |
| Lecithin | 1.1 |
| Maltose | 10.0 |
| Glycerine | 5.0 |
| Palm fat | 20.0 |
| High oleic canola oil | 12.0 |
| Flavor | 1.0 |

The spread test of Example 1 was performed and the fillings of Table 8 and all samples were observed to exhibit minimal filling spread to be about 5.5 cm or less.

TABLE 9

Shelf Life

| Product | Weeks | Moisture, % | RH, % | Hexanals, ppm |
|---|---|---|---|---|
| Raw ground wheat germ based cheese filler | 0 | 4.04 | 26.20 | 0.80 |
| | 4 | 4.22 | 31.20 | 0.92 |
| | 6 | 4.16 | 21.2 | 4.21 |
| | 8 | 4.31 | 33.3 | 1.99 |
| Pregelatinized corn flour based cheese filler | 0 | 4.07 | 26.00 | 0.71 |
| | 4 | 4.14 | 31.00 | 1.33 |
| | 6 | 4.02 | 30.70 | 1.66 |
| | 8 | 4.12 | 32.90 | 3.04 |
| Pregelatinized whole oat flour based cheese filler | 0 | 3.99 | 26.00 | 0.87 |
| | 4 | 3.76 | 27.20 | 1.35 |
| | 6 | 3.81 | 27.90 | 1.67 |
| | 8 | 3.83 | 29.50 | 3.34 |

It will be understood that various changes in the details, materials, and arrangements of the process, formulations, and ingredients thereof, which have been herein described and illustrated in order to explain the nature of the method and resulting lipid-based fillings, may be made by those skilled in the art within the principle and scope of the embodied method as expressed in the appended claims.

What is claimed is:

1. A grain-based soft and creamy food filling that is heat-stable up to an oven temperature of at least about 500° F., the grain-based soft and creamy food filling comprising:
    a continuous lipid phase including at least one lipid having a melting point of about 40° C. or lower;
    a dispersed solid phase in the continuous lipid phase, the dispersed solid phase including a hydrophilic powder and a grain-based component including whole grain to provide all attributes of the whole grain including protein, fiber, and carbohydrates therefrom; and
    a ratio of the grain-based component including the whole grain to the lipid phase effective to impart heat stability of the filling so that the grain-based soft and creamy food filling exhibits minimal filling spread upon a sample heated for about 10 minutes at about 300° F.

2. The grain-based soft and creamy food filling of the claim 1, wherein the grain-based component is a ground grain-based component with a D90 particle size of about 40 to about 45 microns to effect the heat stability.

3. The grain-based soft and creamy food filling of claim 1, wherein the grain-based component is a ground grain-based component with an average particle size of about 15 to about 25 microns to effect the heat stability.

4. The grain-based soft and creamy food filling of claim 1, wherein the grain-based component is selected from whole oat flour, pregelatinized whole oat flour, and mixtures thereof.

5. The grain-based soft and creamy food filling of claim 1, wherein the grain-based soft and creamy food filling includes about 5 to about 25 percent of the grain-based component, about 25 to about 40 percent of the hydrophilic powder, about 0 to about 15 percent of a first lipid, and about 20 to about 40 percent of a second lipid having a melting point greater than the first lipid.

6. The grain-based soft and creamy food filling of claim 1, wherein the ratio of the grain-based component including the whole grain to the lipid phase is a grain-to-oil ratio from about 0.8 to about 4.5.

7. The grain-based soft and creamy food filling of claim 1, wherein the ratio of the grain-based component including the whole grain to the lipid phase is a grain-to-total lipid ratio ranging from about 0.2 to about 0.65.

8. A grain-based soft and creamy food filling that is heat-stable up to an oven temperature of at least about 500° F., the grain-based soft and creamy food filling comprising:
    a continuous lipid phase including at least one lipid having a melting point of about 40° C. or lower;
    a dispersed solid phase in the continuous lipid phase, the dispersed solid phase including a hydrophilic powder and a grain-based component including whole grain to provide all attributes of the whole grain including protein, fiber, and carbohydrates therefrom; and
    a ratio of the grain-based component including the whole grain to the lipid phase effective to impart heat stability of the filling so that the grain-based soft and creamy food filling exhibits minimal filling spread upon a sample heated for about 10 minutes at about 300° F.; and
    wherein the lipid phase includes a first lipid and a second lipid having a melting point greater than the first lipid, the melting point of the first lipid being about 40° C. or lower and the melting point of the second lipid being about 70° C. or higher, where a ratio of the higher melting point lipid to the lower melting point lipid is about 1 to about 4.

9. The grain-based soft and creamy food filling of claim 1, wherein the grain-based component includes about 10 to about 18 percent fiber and about 20 to about 30 percent protein.

10. The grain-based soft and creamy food filling of claim 1, wherein the grain-based soft and creamy food filling has a water activity of about 0.5 or less.

11. The grain-based soft and creamy food filling of claim 1, wherein the hydrophilic powder is a cheese powder.

12. The grain-based soft and creamy food filling of claim 1, wherein the at least one lipid includes vegetable oil.

13. The grain-based soft and creamy food filling of claim 1, wherein the at least one lipid includes palm fat.

14. The grain-based soft and creamy food filling of claim 1, further comprising natural or processed cheese and wherein the grain-based soft and creamy filling has an intermediate water activity of about 0.6 to about 0.85.

15. The grain-based soft and creamy food filling of claim 14, wherein the grain-based soft and creamy food filling includes about 40 to about 45 percent of the natural or processed cheese.

16. The grain-based soft and creamy food filling of claim 1, wherein the grain-based soft and creamy food filling includes about 8 percent or less of polyol-based humectants.

17. The grain-based soft and creamy food filling of claim 16, wherein the polyol-based humectant is glycerine.

18. A grain-based soft and creamy food filling that is heat-stable up to filling temperature of at least about 300° F., the grain-based soft and creamy food filling comprising:
    about 20 to about 55 percent of a continuous lipid phase including about 0 to about 15 percent of a first lipid and about 20 to about 40 percent of a second lipid having a melting point greater than the first lipid;
    about 5 to about 25 percent of a grain-based component dispersed in the continuous lipid phase, the grain-based component including whole grain to provide all attributes of the whole grain including protein, fiber, and carbohydrates therefrom;
    about 25 to about 40 percent of a hydrophilic powder dispersed in the continuous lipid phase;
    about 6 to about 8 percent lecithin; and
    a ratio of the grain-based component including the whole grain to the lipid phase effective so that the grain-based soft and creamy food filling is heat stable and exhibits a filling spread of about 1.2 cm or less upon a sample heated for about 10 minutes at about 300° F.

19. The grain-based soft and creamy food filling of claim 8, wherein the filling includes about 5 to about 25 percent of the grain-based component.

20. The grain-based soft and creamy food filling of claim 18, wherein a the ratio of the grain-based component including the whole grain to the lipid phase is a ratio of the grain-based component to the first lipid ranging from about 0.8 to about 4.5.

21. The grain-based soft and creamy food filling of claim 18, including about 10 percent or less of one or more emulsifiers.

22. The grain-based soft and creamy food filling of claim 18, wherein the filling has about 10 ppm or less hexanals after at least about 6 months.

23. A grain-based soft and creamy food filling that is heat-stable up to an oven temperature of at least about 500° F., the grain-based soft and creamy food filling comprising:
    a continuous lipid phase including at least one lipid having a melting point of about 40° C. or lower;
    a dispersed solid phase in the continuous lipid phase, the dispersed solid phase including a hydrophilic powder and cereal germ; and
    a ratio of the cereal germ to the lipid phase effective to impart heat stability of the filling so that the grain-based soft and creamy food filling exhibits minimal filling spread upon a sample heated for about 10 minutes at about 300° F.

24. The grain-based soft and creamy food filling of the claim 23, wherein the cereal germ has a D90 particle size of about 40 to about 45 microns to effect the heat stability.

25. The grain-based soft and creamy food filling of claim 23, wherein the cereal germ has an average particle size of about 15 to about 25 microns to effect the heat stability.

26. The grain-based soft and creamy food filling of claim 23, wherein the grain-based soft and creamy food filling includes about 5 to about 25 percent of the cereal germ, about 25 to about 40 percent of the hydrophilic powder, about 0 to about 15 percent of a first lipid, and about 20 to about 40 percent of a second lipid having a melting point greater than the first lipid.

27. The grain-based soft and creamy food filling of claim 23, wherein the ratio of the cereal germ to the lipid phase is a grain-to-oil ratio from about 0.8 to about 4.5.

28. The grain-based soft and creamy food filling of claim 23, wherein the ratio of the cereal germ to the lipid phase is a grain-to-total lipid ratio ranging from about 0.2 to about 0.65.

29. The grain-based soft and creamy food filling of claim 23, wherein the cereal germ is wheat germ.

\* \* \* \* \*